United States Patent
Lagouge et al.

(10) Patent No.: US 7,832,111 B2
(45) Date of Patent: Nov. 16, 2010

(54) MAGNETIC SENSING DEVICE FOR NAVIGATION AND DETECTING INCLINATION

(75) Inventors: Matthieu Lagouge, Wuxi (CN); Yaohui Mao, Wuxi (CN)

(73) Assignee: Memsic, Inc., Andover, MA (US)

( * ) Notice: Subject to any disclaimer, the term of this patent is extended or adjusted under 35 U.S.C. 154(b) by 235 days.

(21) Appl. No.: 12/283,164

(22) Filed: Sep. 9, 2008

(65) Prior Publication Data

US 2010/0063768 A1 Mar. 11, 2010

(51) Int. Cl.
*G01C 17/02* (2006.01)
(52) U.S. Cl. .................................... 33/355 R
(58) Field of Classification Search ............. 33/355 R, 33/356, 357, 358, 359
See application file for complete search history.

(56) References Cited

U.S. PATENT DOCUMENTS

| | | | |
|---|---|---|---|
| 5,841,668 A * | 11/1998 | Pahk et al. ................. 33/503 |
| 6,993,849 B1 * | 2/2006 | Campbell et al. ........ 33/366.12 |
| 2005/0115090 A1 | 6/2005 | Yano et al. |
| 2007/0106457 A1 | 5/2007 | Rosenberg |
| 2008/0042973 A1 | 2/2008 | Zhao et al. |
| 2008/0091350 A1 | 4/2008 | Smith et al. |
| 2009/0287451 A1 * | 11/2009 | Sato et al. .................... 33/313 |

* cited by examiner

*Primary Examiner*—G. Bradley Bennett
(74) *Attorney, Agent, or Firm*—Weingarten, Schurgin, Gagnebin & Lebovici LLP

(57) ABSTRACT

A system and device for detecting yaw and changes in pitch angle for use with navigational and positional devices. The system and device include a multi-axis magnetic field sensing device and a controller. Preferably, the magnetic field sensing device is a multi-axis magnetic compass that is capable of sensing variations in pitch and yaw. The controller is adapted to process yaw and pitch rotational data to determine a positive or a negative change in pitch.

19 Claims, 6 Drawing Sheets

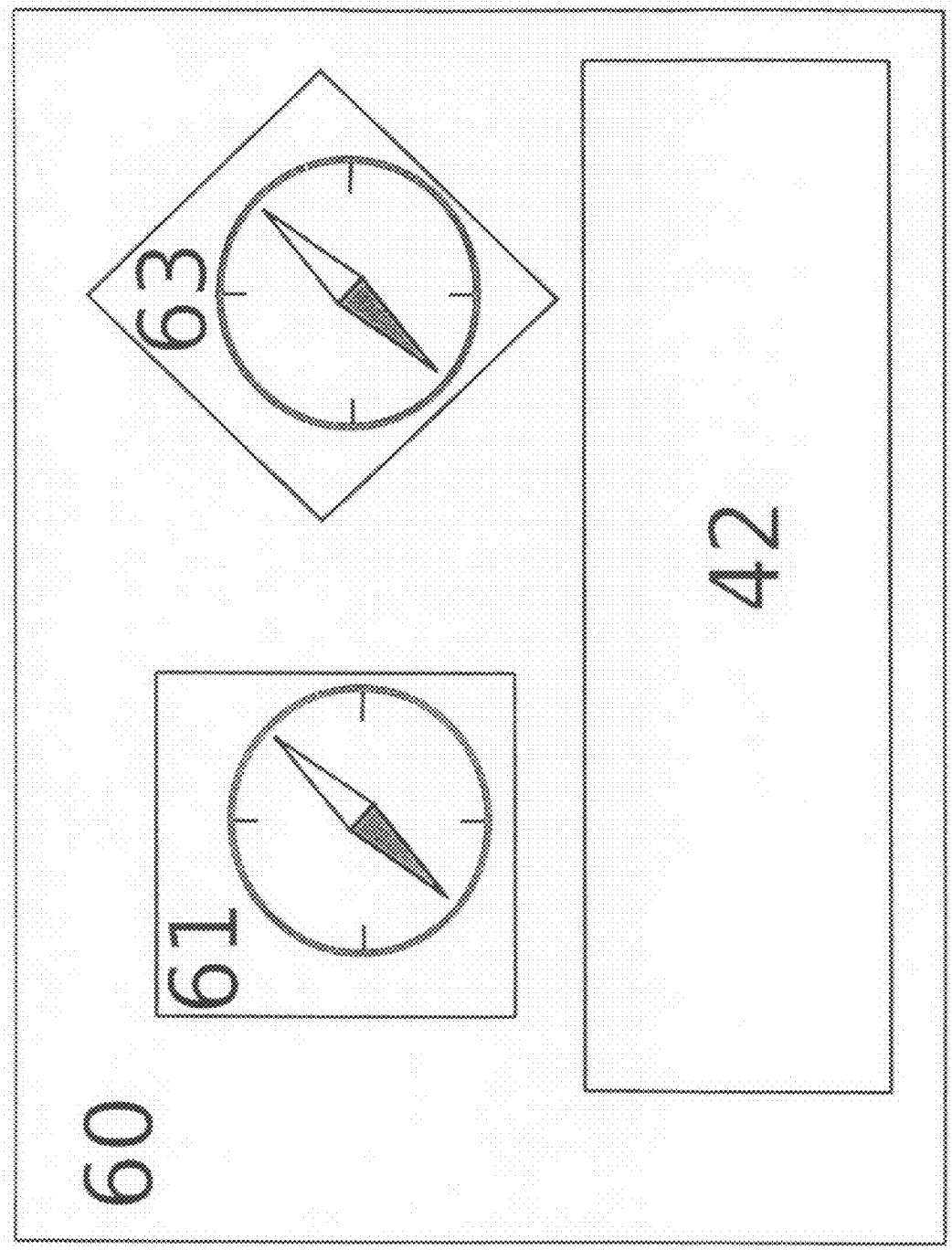

MAGNETIC SENSING DEVICE FOR NAVIGATION AND DETECTING INCLINATION

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of navigational systems and devices and, more particularly, to satellite-based navigational systems and devices capable of detecting inclination and changes in inclination of an object in motion.

In many areas, on-board, satellite-based, three-dimensional travel navigation systems using, for example, the global positioning system ("GPS") have improved dramatically over the past few years. However, such navigation systems continue to have limited resolution, which displays erroneous data to the vehicle operator or passenger/navigator. Indeed, although satellite receivers are adapted to provide vertical resolution that is suitable for displaying the location of the vehicle, poor resolution manifests and is further complicated at, for example, complex interchanges having plural overpasses, underpasses, on-ramps, and off-ramps that overlie or underlie each other.

When elevated roadways and viaducts follow the same or substantially the same route of an underlying roadway, it is difficult for the navigational system to differentiate between the two roadways and, moreover, on which of the roadways the vehicle is actually traveling.

A device using an altimeter is shown in FIG. 2. The device 20 includes a magnetic compass 21, a pressure sensor 23, and a control unit 22. The pressure sensor 23 is adapted to provide pressure measurements from which an altitude can be determined. In theory, the altimeter device 23 would be able to measure the difference in altitude between the elevated roadway or viaduct and the underlying roadway. In practice, however, the vehicle must travel a sufficient horizontal distance (minimum travel distance) on the underlying roadway or on the elevated roadway in order to receive sufficient altitude data to make a determination as to on which roadway the vehicle is traveling. Thus, in many cases having short horizontal distances, the navigational system has no way of correctly assessing the vehicle's true position.

A device using an accelerometer is shown in FIG. 3. The device 30 includes a magnetic compass 31, a two-axis accelerometer 33, and a control unit 32. The accelerometer 33 can be used like an inclinometer, to measure the pitch of the vehicle and further, with data from the magnetic compass 31, to measure variations in the pitch angle.

Pitch is defined as an angle between an object's longitudinal axis and a local horizontal plane. By convention, in aerospace applications, positive pitch refers to "nose up" and negative pitch refers to "nose down". Each of these solutions, however, requires additional circuitry, e.g., the addition of an accelerometer and/or of a gyroscope, which creates additional cost and adds to the sophistication of manufacture. Furthermore, the added circuitry increases the size and power needs of the receiver system to which they are added.

Disadvantageously, with accelerometers, it is difficult to differentiate between acceleration data resulting from natural changes in speed of the vehicle (acceleration, deceleration) and data resulting from a slope. Therefore, it would be desirable to provide a simple and economical navigational system and/or navigational device that can quickly and accurately measure and/or detect whether or not a moving vehicle is operating on a sloped roadway or not. Moreover, it would be desirable to provide a navigation system and/or navigation device that does not require additional embedded circuits and that is not influenced by speed variations.

BRIEF SUMMARY OF THE INVENTION

A system and a device for detecting yaw and changes in pitch angle for use with navigational and positional devices are disclosed. The system and device include a multi-axis magnetic field sensing device and a controller. Preferably, the magnetic field sensing device is a multi-axis magnetic compass that is capable of sensing variations in pitch and yaw. The controller is adapted to process yaw and pitch rotational data to determine a positive or a negative change in pitch.

Other aspects, features, and advantages of the present invention will be apparent from the Detailed Description that follows.

BRIEF DESCRIPTION OF THE SEVERAL VIEWS OF THE DRAWINGS

The invention will be better understood by reference to the following more detailed description and accompanying drawings where like reference numbers refer to like parts:

FIG. 6 shows a device in accordance with a fifth embodiment of the present invention.

DETAILED DESCRIPTION OF THE INVENTION

The following notations are used throughout this disclosure:

x, y, z refer to a local sensor referential, the x-axis points "forward", the y-axis is orthogonal to and in the same horizontal plane as the x-axis, and the z-axis points "upward", orthogonal to the horizontal plane of the x- and y-axes.

$x_G$, $y_G$, $z_G$ refer to an Earth referential, the $x_G$-axis points to magnetic North, the $y_G$-axis points in the magnetic East direction, and the $z_G$-axis points upward.

$\Theta$ is the yaw angle, corresponding to rotation around the $z_G$-axis.

$\Phi$ is the pitch angle, corresponding to rotation around the y-axis after the yaw angle rotation has been applied, but before the roll angle rotation is applied.

$\Omega$ is the roll angle, corresponding to rotation around the x-axis after yaw and pitch are applied.

$M_x$, $M_y$, $M_z$ refer to the magnetic sensors outputs along respectively the x-, y-, and z-axes.

$H_x$, $H_y$, $H_z$ refer to the value of the magnetic field vector in the Earth referential ($X_G$, $y_G$, $Z_G$). By convention, $H_y$ is always equal to zero and, because the Earth magnetic field vector points to the North and downward, $H_x$ is always positive and $H_z$ is always negative.

Figure 1:
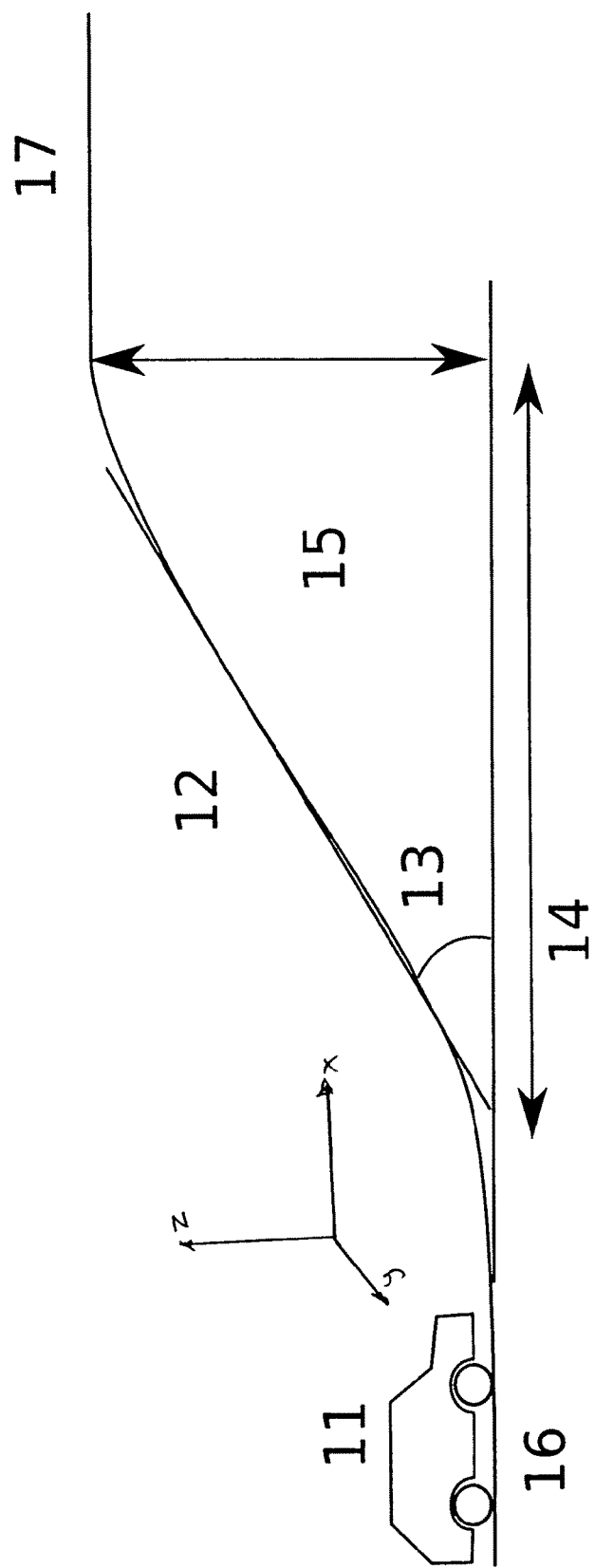
FIG. 1 shows an object approaching a ramped sloped.
Figure 2:
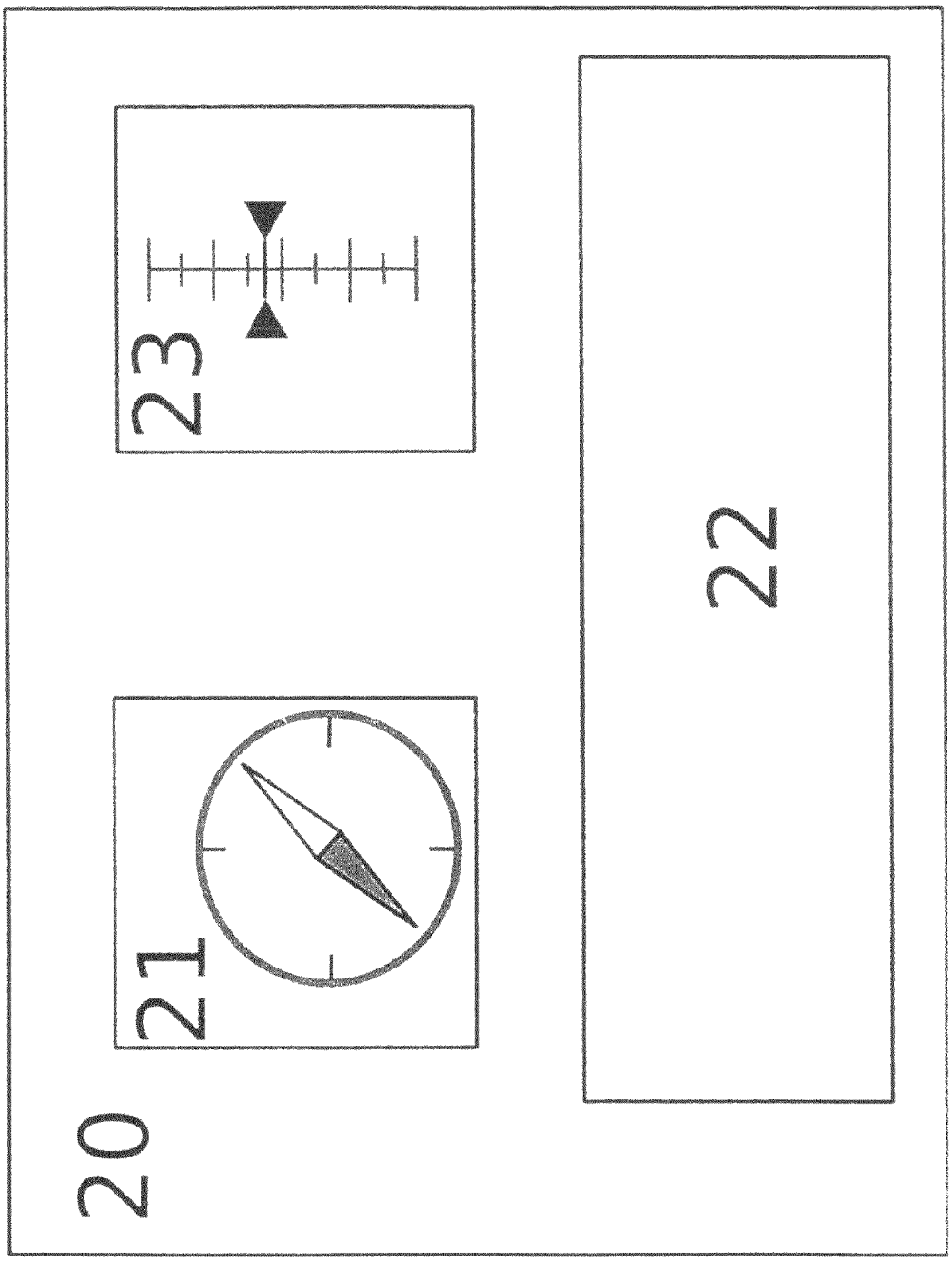
FIG. 2 shows an altimeter-based device in accordance with the prior art.
Figure 3:
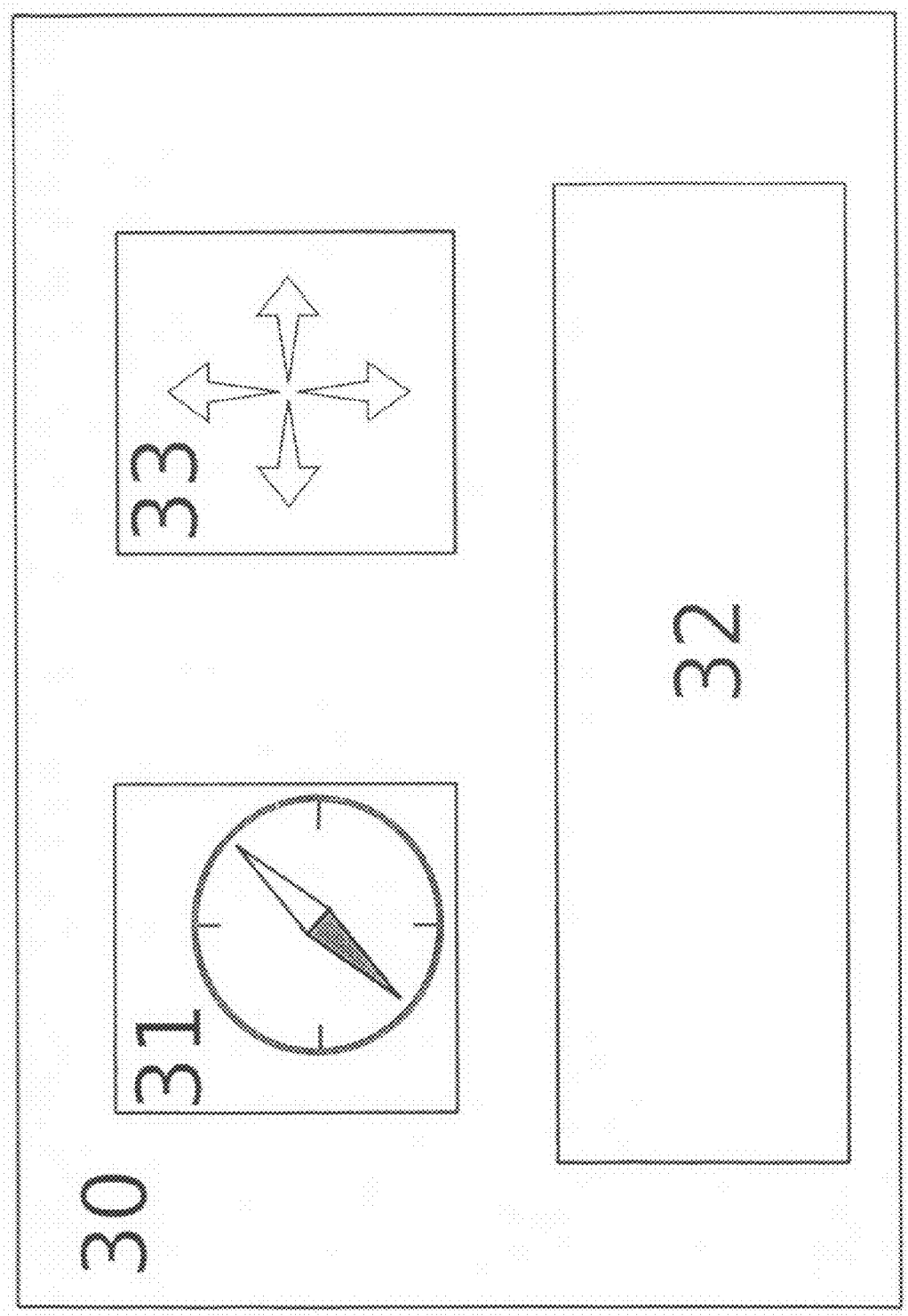
FIG. 3 shows an accelerometer-based device in accordance with the prior art.

Referring to FIG. 1, there is shown a traveling object 11, e.g., a wheeled-vehicle, railed-vehicle, and the like, that is approaching a ramped slope 13 that connects a first roadway 16 to a second roadway 17. For the purposes of this discussion, the ramped slope 13 is an up-ramp in which the elevation of the first roadway 16 is lower than the elevation of the second roadway 17, which is to say that the altitude of the second roadway 17 is greater than the altitude of the first roadway 16 and the ramped slope 13 has a positive pitch. The up-ramp 13 has a rise 15 and a run 14, which determine the slope, i.e., pitch, of the ramped slope 12 in accordance with the equation:

SLOPE($\Phi$)=RISE/RUN

Figure 4:
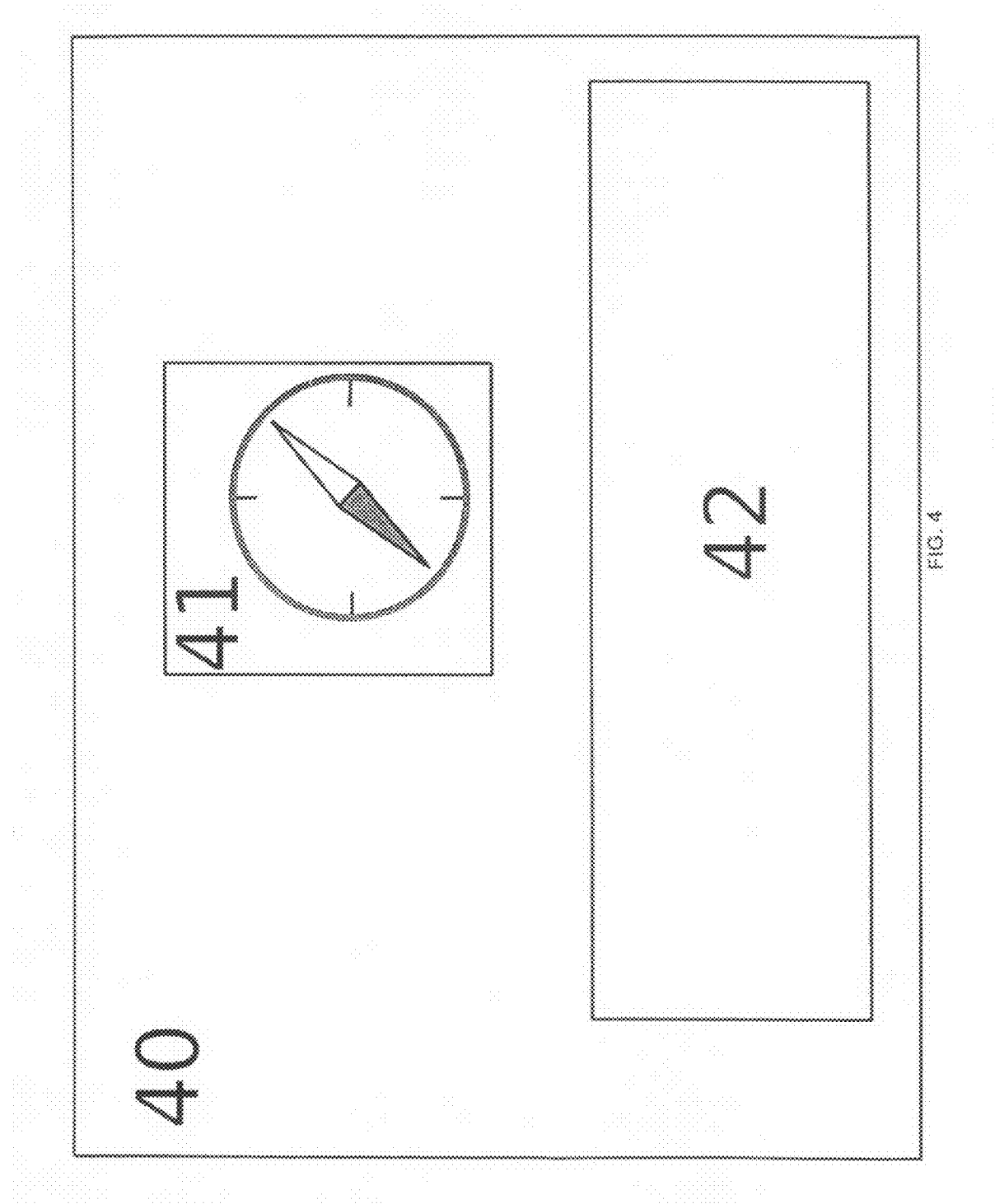
FIG. 4 shows a device in accordance with a first, second and third embodiments of the present invention.

Referring to FIG. 4, the navigational system 40 includes a controller 42 and a multi-axis magnetic field sensing device ("sensor") 41, e.g., a magnetic compass. Because existing, traditional navigational systems already include a controller and a magnetic compass, the present invention does not require additional circuits, devices or hardware but, rather, can include existing navigational systems and devices that have been adapted to include additional software, applications, algorithms, and/or driver programs.

Indeed, magnetic compasses 41 are already provided and adapted to provide real time heading directions. Advantageously, in contrast with some other magnetic field sensors, the system 40 can also sense pitch variations. Gyroscopes and some other magnetic field sensing devices may provide absolute angular position information or may only provide a relative change of angular position information.

As a magnetic field sensing device, the sensors 41 are adapted to measure the magnetic field strength about the x- and y-axes, and optionally the z-axis, and to generate corresponding magnetic field strength signals, respectively, $M_x$, $M_y$, and $M_z$, which are transmitted to and processed by the controller 42. The processing of the sensor's output can generate yaw ($\Theta$) data.

According to the present invention, the sensor's output can be further processed to measure pitch ($\Phi$) variations. If any of the data signals $M_x$, $M_y$, and $M_z$, are analog signals, they can first be converted to digital signals, e.g., using an analog-to-digital converter (ADC), and then subject to digital signal processing as necessary.

The controller 42 can include hardware, software, an application, a program, an algorithm, a driver program, and the like that are adapted to determine pitch or merely to sense changes or variations in pitch angle using magnetic field strength data generated by the sensors 41. In the case of the latter, because any change in pitch will result in a positive change (up-ramp) or negative change (down-ramp), the controller 42 does not have to be programmed to compute the actual angle of pitch. Instead, the controller 42 can instead be programmed to identify a positive or negative change in pitch.

For example, the sensor's output $M_x$, and $M_y$, are governed by the following equations:

$M_x = (\cos(\Theta).\cos(\Phi))H_x + \sin(\Phi)H_z$ and $M_y = (\cos(\Omega).\sin(\Theta) + \sin(\Omega).\sin(\Phi).\cos(\Theta))H_x + (\sin(\Omega).\cos(\Phi))H_z$.

According to a first embodiment of the present invention, if the roll angle ($\Omega$) is zero, the variations of $M_x$ and $M_y$ with respect to the pitch angle are as follow:

$$\frac{\partial M_x}{\partial \Phi}\bigg|_{\Omega=0} = -\sin(\Phi) \cdot \cos(\Theta)H_x + \cos(\Phi)H_z$$

and $$\frac{\partial M_y}{\partial \Phi}\bigg|_{\Omega=0} = 0.$$

Accordingly, by monitoring sensor output, and, more particularly, by focusing on instances at which:

$$\frac{\partial M_x}{\partial t} \neq 0;$$

and $\frac{\partial M_y}{\partial t} = 0,$ it is possible to detect a pitch variation. The sign of $M_x$ and $\Delta M_x$ can then be used in correlation to determine the positive or negative nature of the variation. Those skilled in the art can appreciate that this method can be further adapted to detect variations of the roll angle ($\Omega$) and the scope of the present invention is not limited to the pitch variation detection.

When the partial derivative $$\frac{\partial M_x}{\partial \Phi}\bigg|_{\Omega=0} = 0,$$

depending on the value of the Earth magnetic field angle ($\phi H$), there are more possible solutions. Indeed, if the magnetic field angle is less than or equal to 45°, there exists a roll angle ($\Omega$) value that satisfies the equation:

$$\frac{\partial M_x}{\partial \Phi}\bigg|_{\Omega=0} = 0.$$

Notwithstanding, in the United States the inclination angle is approximately 55° or higher. Hence, the condition can never be met in the United States.

In a second embodiment of the present invention, the amplitude of the magnetic field vector projected on the sensor's plan, $M_{plan}$, can be calculated using the equation:

$$M_{plan} = \sqrt{M_x^2 + M_y^2}$$

Those skilled in the art can appreciate that, although the amplitude of the Earth's magnetic field vector varies, local variations are negligible. Consequently, within an area of several square kilometers, the Earth's magnetic field vector can be considered constant and uniform. Thus, using the rule:

$$\left|\frac{\partial M_{plan}}{\partial t}\right| > \Delta M_{plan, treshold}$$

it is possible to detect variations in either the pitch angle ($\Phi$) or the roll angle ($\Omega$). The distinction between those angles as well as the sign of the variation can be determined using the processed yaw value ($\Theta$) and the measured values $M_x$ and $M_y$.

Those skilled in the art can also appreciate that, depending on the details of the implementation, it is possible to replace the partial derivative $$\left|\frac{\partial M_{plan}}{\partial t}\right|$$

with an equivalent combination of $M_{plan}$, $\Theta$, $M_x$, and $M_y$. Hence, the scope of this invention is not limited to a particular monitoring of one parameter but, rather, can be extended to the use of a two-axis magnetic sensor to detect pitch variations.

In a third embodiment of the present invention, the sensor 41 is replaced by a three-axis magnetic sensor. Advantageously, adding z-axis magnetic field measurement facilitates the calculation of pitch and roll variations. For example, during a pitch variation, the y-axis output remains constant as long as the roll angle ($\Omega$) is null. Consequently, it is very difficult for a dual axes sensor system to provide correct and precise information about pitch and roll if they occur at the same time.

Although a two-axis magnetic sensor cannot completely measure the Earth's magnetic field vector, a three-axis magnetic sensor can measure the z-value of the vector. As a result, one can assume that $H_x$ and $H_z$ are known and/or can be acquired and stored.

As additional information, if the yaw ($\Theta$) is known and is acquired while the vehicle 11 is traveling in a straight line on a plan parallel to the Earth's surface, the z-axis output is governed by the following equation:

$$M_z = (\sin(\Omega)\sin(\Theta) - \cos(\Omega)\sin(\Phi)\cos(\Theta))H_x + \cos(\Omega)\cos(\Phi)H_z.$$

However, if $\Phi$ and $\Omega$ are constant, $M_z$, directly gives $H_z$, which provides details characterization of the Earth's magnetic field vector that, otherwise, would be missed because a two-axes sensor only measures the projection of this vector on the sensor's plan. Accordingly, the yaw ($\Theta$) can be the last calculated value before a variation of $M_z$ is detected.

The Solution of the Equation:

$$C = A \cos(x) + B \sin(x)$$

is of the form:

$$x = \arctan\left(\frac{B}{A}\right) + \arccos\left(\frac{C\cos\left(\arctan\left(\frac{B}{A}\right)\right)}{A}\right).$$

$M_x$ gives $\Phi$ using $$\begin{cases} C = M_x \\ A = H_x \cos(\Theta) \\ B = H_z \end{cases}$$

and $M_y$ gives $\Omega$ using $$\begin{cases} C = M_y \\ A = H_x \sin(\Theta) \\ B = \sin(\Phi)\cos(\Theta) - \cos(\Phi)H_z \end{cases}$$

As a result, the additional axis of sensitivity allows the calculation of the complete attitude of the system.

Figure 5:
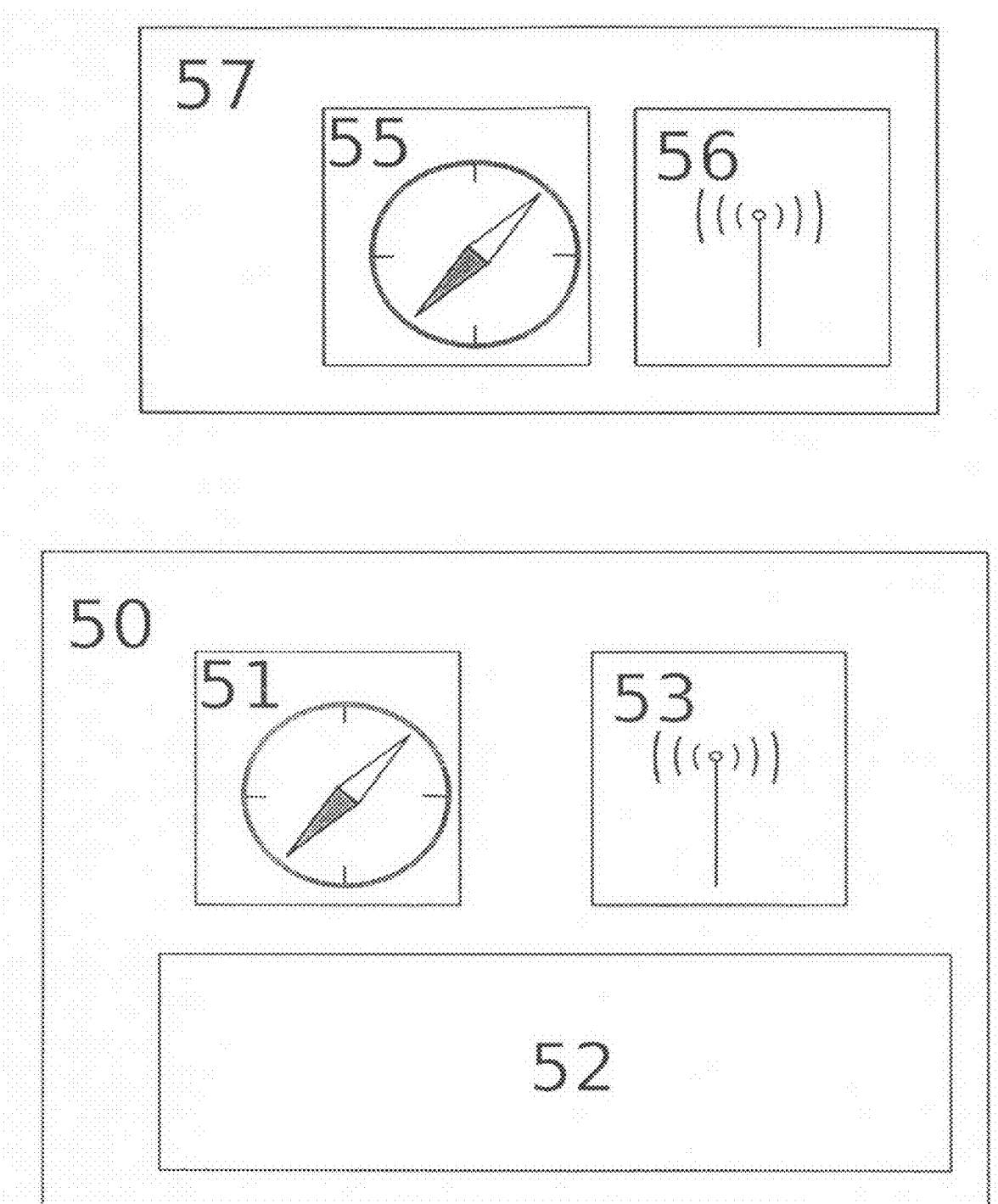
FIG. 5 shows a device in accordance with a fourth embodiment of the present invention.

A fourth embodiment is shown in FIG. 5. The embodied navigation system 50 includes a two-axis magnetic sensor 51, a main unit 52, as well as a short or medium range communication system 53. The communication system 53 is adapted to communicate with an external local or remote magnetic sensor system 57 that also includes a reference magnetic sensor 55 and a communication unit 56.

The two-axis magnetic sensor 51 is structured and arranged to provide the main unit 52 with precise data about the Earth's magnetic field in the current localization of the device 50, which is to say $H_x$ and $H_z$. These data are processed to calculate the inclination angle of the magnetic field ($100_H$).

Alternatively, the local or remote fixed system 57 is structured and arranged to provide the calculated inclination angle directly. Those skilled in the art will understand that the communication device 53 can also be replaced with an internal database that can be stored in the system 50. The internal database can embed both roadway data and Earth's magnetic field data so that the main unit 52 can acquire the location of the system 50 from a navigational positioning system, e.g., GPS and the like, and can extract from the database the characteristics of the Earth's magnetic field at the given location of the system 50. With this embodiment, updated information about the variation of the Earth's magnetic field with time would also be needed.

Those skilled in the art can appreciate that the embedded database can be shared with the local or remote station 57, allowing for making a distinction between average Earth's magnetic field in a relative larger area provided by the database, and local variations due to particular surrounding environment in a relative smaller area. Because $H_x$ and $H_z$ are provided by an external source, calculations can be performed similar to those described in connection with the third embodiment.

In a fifth embodiment, as shown in FIG. 6, a pair of two-axis sensors 61 and 63 are structured and arranged in a common plane such that their respectively longitudinal (x-) axes and lateral (y-) axes are offset by 45 degrees. Such offset can be used to provide redundant pitch angle variation and direction data, to improve reliability. Data from both sensors 61 and 63 can be provided to a control unit 42.

Calibration of magnetic sensors 61 and 63 is delicate, and can be imprecise, especially proximate the extreme points, e.g., the maxima and minima of the measured Earth's magnetic field. Hence, including a second sensor 63 that is oriented at 45° to a first sensor 61 and comparing the data from each eases the computation and reliability of information at or near these extreme regions.

Magnetic field strength and yaw data can also be generated by a two- or three-axis magnetic compass that is not mounted on a vehicle but, rather, can be included in portable and/or hand-held devices, e.g., personal navigational devices (PNDs), personal digital assistants (PDAs), mobile phones, cellular phones, portable multimedia players, video MP3, mobile Internet devices (MIDs), and the like for navigational purposes.

It will be apparent to those of ordinary skill in the art that modifications to and variations of the above-described system and device may be made without departing from the inventive concepts described herein. Accordingly, the invention should not be controlled except by the scope and spirit of the appended claims.

What is claimed is:

1. A system for detecting at least one of yaw and changes in pitch angle for use with navigational and positional devices, the system comprising:
   a sensing device consisting of:
      a multi-axis magnetic field sensing device that is structured and arranged to sense variations in pitch and yaw; and
      a controller that is adapted to process yaw and pitch rotational data generated by the magnetic field sensing device to determine a positive or a negative change in pitch.

2. The system as recited in claim 1, wherein the multi-axis magnetic field sensing device is a multi-axis magnetic compass.

3. The system as recited in claim 1, wherein the multi-axis magnetic field sensing device is a three-axis magnetic sensor.

4. The system as recited in claim 1, wherein the multi-axis magnetic field sensing device is structured and arranged to measure magnetic field strength and to generate magnetic field strength signals $M_x$, $M_y$, and $M_z$, where $M_x$ is the magnetic field strength signal about the x-axis, $M_y$ is the magnetic field strength signal about the y-axis, and $M_z$ is the magnetic field strength signal about the z-axis.

5. The system as recited in claim 4, wherein the magnetic field strength signal about the x-axis ($M_x$) and the magnetic field strength signal about the y-axis ($M_y$) are generated in accordance with the following formulae:

$$M_x = (\cos(\Theta) \cdot \cos(\Phi))H_x + \sin(\Phi)H_z$$

and $$M_y = (\cos(\Omega) \cdot \sin(\Theta) + \sin(\Omega) \cdot \sin(\Phi) \cdot \cos(\Theta))H_x + (\sin(\Omega) \cdot \cos(\Phi))H_z$$

in which $\Omega$ refers to a roll angle, $\Phi$ refers to a pitch angle, $\Theta$ refers to a yaw angle, and $H_x$ and $H_z$ refer to values of the magnetic field vector in an Earth referential.

6. The system as recited in claim 5, wherein a variation in the pitch angle is determined using the following equations:

$$\left.\frac{\partial M_x}{\partial \Phi}\right|_{\Omega=0} = -\sin(\Phi) \cdot \cos(\Theta)H_x + \cos(\Phi)H_z$$

and $$\left.\frac{\partial M_y}{\partial \Phi}\right|_{\Omega=0} = 0.$$

7. The system as recited in claim 4, wherein a variation in at least one of the pitch angle and the yaw angle is determined using the following rule:

$$\left|\frac{\partial M_{plan}}{\partial t}\right| > \Delta M_{plan,treshold}$$

wherein $M_{plan}$ refers to a magnetic field vector projected on the plan of the sensing device and is calculated using the equation:

$$M_{plan} = \sqrt{M_x^2 + M_y^2}.$$

8. The system as recited in claim 3, wherein the three-axis magnetic sensor is further adapted to generate a magnetic field strength signal about the z-axis is generated in accordance with the following formula:

$$M_z = (\sin(\Omega)\sin(\Theta) - \cos(\Omega)\sin(\Phi)\cos(\Theta))H_x + \cos(\Omega)\cos(\Phi)H_z$$

in which $\Omega$ refers to a roll angle, $\Phi$ refers to a pitch angle, $\Theta$ refers to a yaw angle, and $H_x$ and $H_z$ refer to values of the magnetic field vector in an Earth referential.

9. The system as recited in claim 1, the sensing device further consisting of:
   an external magnetic sensor system; and
   a communication system for transmitting magnetic field strength signals about the Earth's magnetic field from the external magnetic sensor system to the controller.

10. The system as recited in claim 9, wherein the controller is adapted to calculate an inclination angle of the magnetic field using the magnetic field strength signals from the external magnetic sensor system and magnetic field strength signals from the magnetic field sensing device.

11. A device for improving navigational and positional calculations, the device consisting of:
   a multi-axis magnetic field sensing device that is structured and arranged to sense variations in pitch and yaw; to generate yaw and pitch rotational data; and to transmit these data to a controller that is adapted to determine a positive or a negative change in pitch therefrom.

12. The system as recited in claim 11, wherein the multi-axis magnetic field sensing device is a multi-axis magnetic compass.

13. The system as recited in claim 1, the sensing device further consisting of:
   a second multi-axis magnetic field sensing device having a longitudinal axis and a lateral axis that is structured and arranged in a common plane with the multi-axis magnetic field sensing device having a longitudinal axis and a lateral axis, such that the longitudinal axis and the lateral axis of the second multi-axis magnetic field sensing device are oriented at an angle, respectively, to the longitudinal axis and the lateral axis of the multi-axis magnetic field sensing device.

14. The system as recited in claim 13 wherein the angle is 45 degrees.

15. A method of detecting at least one of yaw and changes in pitch angle for use with navigational and positional devices, the method consisting of:
   sensing variations in pitch and yaw using a multi-axis magnetic field sensing device to sense the Earth's magnetic field strength; and
   processing yaw and pitch rotational data generated by the magnetic field sensing device; and
   determining a positive or a negative change in pitch.

16. The method as recited in claim 15, further consisting of generating magnetic field strength signals $M_x$, $M_y$, and $M_z$, where $M_x$ is the magnetic field strength signal about the x-axis, $M_y$ is the magnetic field strength signal about the y-axis, and $M_z$ is the magnetic field strength signal about the z-axis.

17. The method as recited in claim 16, wherein the magnetic field strength signal about the x-axis ($M_x$) and the magnetic field strength signal about the y-axis ($M_y$) are generated in accordance with the following formulae:

$$M_x = (\cos(\Theta) \cdot \cos(\Phi))H_x + \sin(\Phi)H_z$$

and $$M_y = (\cos(\Omega) \cdot \sin(\Theta) + \sin(\Omega) \cdot \sin(\Phi) \cdot \cos(\Theta))H_x + (\sin(\Omega) \cdot \cos(\Phi))H_z$$

in which $\Omega$ refers to a roll angle, $\Omega$ refers to a pitch angle, $\Theta$ refers to a yaw angle, and $H_x$ and $H_z$ refer to values of the magnetic field vector in an Earth referential.

18. The method as recited in claim 17, wherein determining a variation in the pitch angle is determined using the following equations:

$$\frac{\partial M_x}{\partial \Phi}\bigg|_{\Omega=0} = -\sin(\Phi) \cdot \cos(\Theta)H_x + \cos(\Phi)H_z$$

and $$\frac{\partial M_y}{\partial \Phi}\bigg|_{\Omega=0} = 0.$$

19. The method as recited in claim 15, wherein a magnetic field strength signal about the z-axis is generated in accordance with the following formula:

$$M_z = (\sin(\Omega)\sin(\Theta) - \cos(\Omega)\sin(\Phi)\cos(\Theta))H_x + \cos(\Omega)\cos(\Phi)H_z$$

in which $\Omega$ refers to a roll angle, $\Phi$ refers to a pitch angle, $\Theta$ refers to a yaw angle, and $H_x$ and $H_z$ refer to values of the magnetic field vector in an Earth referential.

* * * * *

UNITED STATES PATENT AND TRADEMARK OFFICE
CERTIFICATE OF CORRECTION

PATENT NO. : 7,832,111 B2  Page 1 of 1
APPLICATION NO. : 12/283164
DATED : November 16, 2010
INVENTOR(S) : Matthieu Lagouge et al.

It is certified that error appears in the above-identified patent and that said Letters Patent is hereby corrected as shown below:

Column 6, line 14, "$(100_H)$" should read -- $(\varphi_H)$ --; and

Column 8, claim 17, line 67, "$\Omega$" should read -- $\Phi$ --.

Signed and Sealed this
Thirtieth Day of August, 2011

David J. Kappos
*Director of the United States Patent and Trademark Office*